US012463387B2

(12) United States Patent
Scharkowski et al.

(10) Patent No.: US 12,463,387 B2
(45) Date of Patent: Nov. 4, 2025

(54) HOUSING FOR HOUSING A CONDUCTOR CONNECTING FLAT CONDUCTOR RAIL TO A CONNECTING CONNECTOR, A SYSTEM INCLUDING SAID HOUSING, AND METHOD FOR MANUFACTURING THE SYSTEM

(71) Applicant: Auto-Kabel Management GmbH, Hausen i.W. (DE)

(72) Inventors: Oliver Scharkowski, Guben (DE); Sebastian Fels, Steinen (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 652 days.

(21) Appl. No.: 17/770,775

(22) PCT Filed: Aug. 19, 2020

(86) PCT No.: PCT/EP2020/073169
§ 371 (c)(1),
(2) Date: Apr. 21, 2022

(87) PCT Pub. No.: WO2021/078423
PCT Pub. Date: Apr. 29, 2021

(65) Prior Publication Data
US 2022/0368085 A1 Nov. 17, 2022

(30) Foreign Application Priority Data
Oct. 21, 2019 (DE) ..................... 10 2019 128 294.2

(51) Int. Cl.
*H01R 13/6593* (2011.01)
*H01R 9/05* (2006.01)
(Continued)

(52) U.S. Cl.
CPC ....... *H01R 13/6593* (2013.01); *H01R 9/0527* (2013.01); *H01R 13/40* (2013.01);
(Continued)

(58) Field of Classification Search
CPC .. H01R 13/6593; H01R 9/0527; H01R 13/40; H01R 13/502; H01R 13/648;
(Continued)

(56) References Cited

U.S. PATENT DOCUMENTS 9,954,320 B1 * 4/2018 Hassan .............. H01R 13/6593
2018/0174716 A1 6/2018 Kominato et al.

FOREIGN PATENT DOCUMENTS

JP S63-205072 A 8/1988
JP 2011-113928 A 6/2011
(Continued)

OTHER PUBLICATIONS

International Searching Authority/EP, International Search Report and Written Opinion of the International Searching Authority, Application No. PCT/EP2020/073169, dated Nov. 19, 2020, 13 pages (with English translation of the International Search Report).
(Continued)

*Primary Examiner* — Justin M Kratt
(74) *Attorney, Agent, or Firm* — Sunstein LLP

(57) ABSTRACT

Housing for attachment to an electrical flat conductor rail with a flat conductor receptacle extending in a first axis, a connecting conductor receptacle extending transversely to the first axis in a second axis, wherein the flat conductor receptacle and the connecting conductor receptacle are formed from a upper housing side and a lower housing side with in each case an inner side and an outer side, which, in the closed state of the housing, receive the flat conductor rail with their inner sides lying opposite one another, characterized in that a shield contact element is arranged on at least one inner side, the shield contact element, in the closed state of the housing, bearing directly against a shield conductor of the flat conductor rail.

4 Claims, 10 Drawing Sheets

(51) Int. Cl.

| | |
|---|---|
| ***H01R 13/40*** | (2006.01) |
| ***H01R 13/502*** | (2006.01) |
| ***H01R 13/648*** | (2006.01) |
| ***H01R 43/00*** | (2006.01) |
| ***H02G 15/105*** | (2006.01) |
| ***H02G 15/117*** | (2006.01) |
| ***H02G 15/16*** | (2006.01) |
| *B60R 16/02* | (2006.01) |
| *H01R 9/03* | (2006.01) |
| *H01R 13/50* | (2006.01) |
| *H01R 13/655* | (2006.01) |
| *H01R 13/6581* | (2011.01) |
| *H01R 25/14* | (2006.01) |
| *H01R 25/16* | (2006.01) |
| *H02G 15/10* | (2006.01) |
| *H02G 15/113* | (2006.01) |
| *H02G 15/115* | (2006.01) |

(52) U.S. Cl.

CPC ......... *H01R 13/502* (2013.01); *H01R 13/648* (2013.01); *H01R 43/00* (2013.01); *H02G 15/105* (2013.01); *H02G 15/117* (2013.01); *H02G 15/16* (2013.01); *B60R 16/0215* (2013.01); *H01R 9/03* (2013.01); *H01R 9/05* (2013.01); *H01R 9/0509* (2013.01); *H01R 9/0512* (2013.01); *H01R 13/501* (2013.01); *H01R 13/655* (2013.01); *H01R 13/6581* (2013.01); *H01R 25/14* (2013.01); *H01R 25/145* (2013.01); *H01R 25/16* (2013.01); *H01R 25/161* (2013.01); *H01R 25/162* (2013.01); *H02G 15/10* (2013.01); *H02G 15/113* (2013.01); *H02G 15/115* (2013.01)

(58) Field of Classification Search

CPC . H01R 43/00; H01R 9/03; H01R 9/05; H01R 9/0509; H01R 9/0512; H01R 13/501; H01R 13/655; H01R 13/6581; H01R 25/14; H01R 25/145; H01R 25/16; H01R 25/161; H01R 25/162; H02G 15/105; H02G 15/117; H02G 15/16; H02G 15/10; H02G 15/113; H02G 15/115; B60R 16/0215

See application file for complete search history.

(56) References Cited

FOREIGN PATENT DOCUMENTS

| | | | | | |
|---|---|---|---|---|---|
| WO | WO-2018141668 | A1 * | 8/2018 | ........... | H01R 13/506 |
| WO | WO 2019/180996 | A1 | 9/2019 | | |
| WO | WO-2019180995 | A1 * | 9/2019 | | |

OTHER PUBLICATIONS

German Patent Office, Office Action, Application No. 10 2019 128 294.2, dated Sep. 15, 2020, 6 pages (in German).

* cited by examiner

HOUSING FOR HOUSING A CONDUCTOR CONNECTING FLAT CONDUCTOR RAIL TO A CONNECTING CONNECTOR, A SYSTEM INCLUDING SAID HOUSING, AND METHOD FOR MANUFACTURING THE SYSTEM

CROSS-REFERENCE TO RELATED APPLICATIONS

This application is the national phase entry of international patent application no. PCT/EP2020/073169 filed Aug. 19, 2020 and claims the benefit of German patent application No. 10 2019 128 294.2, filed Oct. 21, 2019, the disclosures of which are incorporated herein by reference in their entirety.

TECHNICAL FIELD

The subject matter relates to a housing for attachment to an electrical flat conductor rail, a system with such a housing and a flat conductor rail, as well as a method for manufacturing such a system.

BACKGROUND ART

From the prior art, housing elements for electrical conductor arrangements with a substantially dimensionally stable flat conductor rail for use in a motor vehicle are already known.

In particular, the use of flat conductor rails, especially as rigid flat conductors, is becoming increasingly important in automotive engineering. The flat conductor rail has advantages over round conductors in terms of installation space requirements. Laying a flat conductor rail, in particular a rigid flat conductor rail, is advantageous over conventional round conductors.

In previous applications, the flat conductor rail is usually used unshielded. However, due to ever higher power requirements and higher voltages in wiring systems, shielding of flat conductor rails will be unavoidable in the future.

The flat conductor rails are increasingly being used as so-called energy backbones and are the central electrical distribution system within the vehicle. Starting from the flat conductor rail, a number of branches can be provided via which loads tap electrical power from the flat conductor rail. For high-voltage applications, not only the flat conductor rails but also the feeders must be shielded, and there must be a secure shield connection between the shield of the flat conductor rail and the shield of the connecting conductor or a housing that is connected to the flat conductor rail. Previously known housing elements only serve to electrically insulate the connection between the flat conductor rail and the connecting conductor, but do not provide sufficient shielding and certainly no shield connection between the flat conductor rail and the connecting conductor.

The subject matter was thus based on the object of providing flat conductor rails with electrical outlets with electromagnetic compatibility.

SUMMARY OF THE INVENTION

The present housing is formed for attachment to an electrical flat conductor rail. For this purpose, the housing has a flat conductor receptacle extending in a first axis. The first axis preferably runs parallel, in particular coaxially, to the longitudinal axis of the flat conductor which can be inserted into the flat conductor receptacle.

Transverse to this axis, in particular perpendicular to this axis, runs a second axis along which a connecting conductor receptacle extends. A connecting conductor can be a flat conductor or a round conductor which is electrically connected to the flat conductor rail. Both the flat conductor and the connecting conductor, may be formed sheathed with an inner insulator. The inner insulator may be single or multi-piece, for example, the inner insulator may be formed by an insulating material and a film of dielectric.

A shielding element may be disposed on the inner insulator. The shielding element may also be referred to as a shielding conductor. The shielding element may be a conductor braid and/or a conductor foil. The shielding element is surrounded by an outer insulator, but may initially also be surrounded by a shielding foil formed from dielectric material. This multi-layer structure of cables is sufficiently known for the electromagnetic compatibility of electric conductors in high-voltage applications.

The present housing with flat conductor receptacle and flat conductor receptacle is formed of a housing top side and a housing bottom side. Both the upper side of the housing and the lower side of the housing each have an inner side and an outer side. To close the housing after the flat conductor and the connecting conductor have been inserted into the housing top side and/or the housing bottom side, the housing top side and the housing bottom side can be placed on top of each other, thereby closing the housing. In the closed state, the inner side of the upper side of the housing and the lower side of the housing are opposite each other and surround the flat conductor rail, in particular the outer insulation of the flat conductor rail.

In order to be able to electrically pick off the shield arranged on the flat conductor rail, it is proposed that a shield contact element be arranged on at least one of the inner sides.

The shield contact element is an electrically conductive element, in particular a metallic element, which rests on the inside of the housing, in particular as a flat part. The shield contact element is placed on the inside of the housing in such a way that, when the housing is closed, it is in direct contact with a shielding element of the flat conductor rail.

The upper side of the housing and/or the lower side of the housing may be injection molded from a plastic material.

The flat conductor receptacle may extend along the first axis and may, for example, be U-shaped. In the installed state, the flat conductor receptacle can at least partially embrace the flat conductor rail.

The connection part can be formed as a plug-in contact part or as a connection conductor. The connection part can be a shielded conductor or a metal flat part, in particular a metal tab. The connection part (also called connecting conductor) can be flat or round. If the connecting part is bimetallic, it may be formed at a first end from a first metal and at a second end from a second metal different from the first metal. In particular, the connector may be formed at the end connected to the flat conductor rail from the same or an electrically similar metal as the flat conductor rail. For example, the flat conductor rail may be formed of an aluminum material. The connecting part may also be formed of aluminum material in the area where it is connected to the flat conductor rail. At an opposite end, the connecting part may be formed of a copper material, for example. The flat conductor rail may be formed of a copper material, for example. The connecting part may also be formed of copper material in the area where it is connected to the flat conductor rail. At an opposite end, the connecting part may be formed of an aluminum material, for example. In each case, a material may be the pure metal or a metal alloy.

The conductor cross-section of the connecting part may be equal to or less than the conductor cross-section of the flat conductor rail.

According to one embodiment, it is proposed that a contact area is formed in the flat conductor receptacle in the area where the first axis and the second axis intersect. In the contact area, the flat conductor and the connecting conductor are in direct contact with one another, in particular are connected to one another by a material bond and/or by a form fit. Both the flat conductor rail and the connecting conductor are bare in this contact area. This means that both the insulation layers and the shielding layers are removed there and the connecting conductor and flat conductor are in contact with each other unshielded and uninsulated.

In the contact area, according to one embodiment example, the connecting conductor can be joined to the flat conductor in the joined state. The connecting conductor and flat conductor can be joined in a form-fit, material-fit and/or force-fit manner. An intermetallic joint may be formed between the flat conductor and the connecting conductor.

When conductor or rail is mentioned, it may mean the cable core of the connecting conductor and/or the flat conductor rail, or it may mean the insulated and electrically shielded cable core. A cable core can be a stranded wire. A cable core may be formed from a solid material.

According to an embodiment, it is proposed that the shield contact element is arranged at the side of the contact area. In the contact area, the bare metal of the flat conductor bar and the connecting conductor is exposed. The shield contact element must not come into electrical contact with the cable cores of the flat conductor rail and the connecting conductor. For this reason, the shield contact element is arranged to the side of the contact area.

The contact area is preferably an area in the flat conductor rail where the outer insulation is removed. At a distance from the outer insulation, an area can be provided in which the shielding is also removed. At a distance from this, the inner insulation can be removed. Thus, outer insulation, shielding and inner insulation are removed in steps at a distance from each other, so that the cable core is bare in a core area. This is the contact area. The shield contact element is preferably spaced from the contact area in such a way that, in the joined state, it is in the area where the shielding is exposed.

According to an embodiment, it is proposed that the shield contact element is arranged along the second axis starting from the connecting conductor behind the contact area. Preferably, the contact area is provided at a longitudinal edge of the flat conductor rail. At a longitudinal edge of the flat conductor rail, the outer insulation can be removed in a U-shape on both sides of the flat conductor rail, and then the shielding and the inner insulation can be removed in steps as described above. In a top view of the flat conductor rail, the contact area is thus surrounded by the inner insulation in a U-shape. The area of the inner insulation is thus in turn surrounded by the shielding in a U-shape, and the shielding is surrounded by the outer insulation in a U-shape. This sequence can be provided on the upper and/or lower side of the flat conductor rail, in particular the wide surfaces of the flat conductor rail.

In a lateral view, on a narrow surface of the flat conductor rail, the contact area can be continuous, du delimited on both sides by the inner insulation. On both sides of the inner insulation the shielding is open and on both sides of the shielding is the outer insulation.

In particular, the shield contact element can be in contact with the wide surfaces of the flat conductor rail in which the shielding is open. Accordingly, the shield contact element is arranged on one of the inner sides of the housing.

According to an embodiment, it is proposed that a dielectric is arranged in the contact area on the shield contact element. The shield contact element can, for example, be arranged in a planar manner on one of the inner sides or both inner sides. In particular, the shield contact element can also be arranged on the inner side where the contact area is in the joined state. In order to prevent the shield contact element from coming into electrical contact with the contact area, i.e. the cable core of the flat conductor and/or connecting conductor, it is proposed that an insulating element, in particular made of a dielectric and/or a plastic, rests on the shield contact element in this area. In the joined state, the insulation element lies on the contact area as internal insulation. Viewed from the inside out, the cable core, insulation element (dielectric and/or plastic), shield contact element and upper housing part and/or lower housing part are thus arranged. The housing thus reproduces the shielding of the flat conductor rail in the area of the shield contact element.

According to an embodiment, it is proposed that the housing top and/or housing bottom is formed in the contact area as a multilayer laminate with an outer insulation material, an insulation element and the shield contact element arranged between the outer insulation material and the insulation element.

As explained previously, the housing serves to shield the flat conductor bar and/or the connecting conductor in the contact area. In the contact area, both the flat conductor rail and the connecting conductor are exposed in order to join them together, in particular to join them intermetallically, preferably to join them with a material bond. Since the outer insulation, the shielding and the inner insulation must be removed in this area, the shielding must be restored there after joining. This is made possible by the top and/or bottom of the housing, in which a multilayer structure of the flat conductor rail and/or the connecting conductor is simulated in the contact area. In particular, the insulation element is formed of the same material(s) or material(s) having the same or similar electrical properties as the internal insulation.

According to an embodiment, it is proposed that an insulation element is arranged at least in parts in the connecting conductor housing on the shield contact element. The housing, in particular the upper side of the housing and/or the lower side of the housing, has a corresponding multi-layer structure not only in the contact area but also in the area of the connecting conductor receptacle where the connecting conductor is exposed, in order to also restore the shielding in the area of the connecting conductor. What was said before for the contact area applies accordingly.

According to an embodiment, it is proposed that the shield contact element embraces the contact area along at least two legs extending transversely to one another, in particular that the shield contact element embraces the contact area with three legs, in particular embraces it in a U-shape. As already explained, the contact area is exposed on the flat conductor rail. For this purpose, the outer insulation is removed at one side edge. Preferably at a certain distance from this, the shielding is removed in the exposed area. Then, in the area where the shielding has been removed, in particular at a distance from the separating edge where the shielding was removed, the insulation is also removed. This can be done on the top side, the bottom side and/or all around a side edge on the flat conductor rail. Then the shield contact element embraces the contact area in a U-shape.

To achieve good contact between the shield contact element and the shielding conductor, a good mechanical connection between the shield contact element and the shielding conductor is also necessary. In order to achieve a sufficient contact pressure, it is suggested that the shield contact element protrudes arcuately from the plane of the inner side. The shield contact element can protrude from the plane of the inner side in the manner of a spring. If the housing is closed, for example by placing the upper part of the housing on the lower part of the housing and latching by means of corresponding latching elements, for example by snap locks, a pressing force can be exerted on the shield contact element, whereby the latter is pressed against the shielding conductor.

According to an embodiment, it is proposed that the shield contact element extends into the connecting conductor receptacle. The connecting conductor receptacle may be formed as a socket in the housing. The shield contact element may be arranged on at least parts of the inner walls of the connecting conductor receptacle. Here, too, it can protrude arcuately from the plane of the inner side. In this way, the shield contact element enables a connection between a shield of the flat conductor rail and a shield of the connecting conductor. The shield contact element short-circuits the shield of the flat conductor rail with a shield of the connecting conductor.

According to an embodiment, it is proposed that the flat conductor receptacle has a cross-sectional profile with a bottom and at least one side wall for receiving the flat conductor rail and that the shield contact element is arranged at the bottom of the flat conductor receptacle. If the flat conductor rail is inserted into the flat conductor receptacle after it has been stripped and the contact area has been exposed, the shield contact element at the bottom is in contact with the shield conductor of the flat conductor rail.

According to an embodiment, it is proposed that the connecting conductor receptacle has a cross-sectional profile with a base and at least one side wall for receiving the connecting conductor, and that the shield contact element is arranged on the side wall of the connecting conductor receptacle. However, the shield contact element can also be arranged on the base of the connecting conductor receptacle. If the connecting conductor is inserted into the connecting conductor receptacle after it has been stripped and the contact area has been exposed, the shield contact element is in contact with the shielding conductor of the connecting conductor at the side and/or at the base.

In particular, the flat conductor rail is already firmly connected to the connecting conductor. Surrounding the contact area between the flat conductor rail and the connecting conductor, the shielding conductor of the flat conductor rail and the connecting conductor can be in contact. The shield contact element can connect these two shielding conductors to each other.

According to an embodiment, it is suggested that the shield contact element protrudes arcuately from the plane of the inner wall of the housing. Corresponding to the shield contact element on the inner side of the housing, in particular on the inner side from the upper housing part and/or lower housing part, the shield contact element can be arranged in the connecting conductor receptacle on the side wall and/or the bottom and can also be pressed resiliently against the shielding conductor.

According to an embodiment, it is proposed that the upper housing side and lower housing side are connected to each other via at least one hinge element arranged on the side of the flat conductor receptacle opposite the connecting conductor receptacle. The hinge element may be, for example, a film hinge. Also, the upper housing part and the lower housing part may be detachably connected to each other, and the hinge element may be a plug-in element in which the upper housing part and the lower housing part may be inserted into each other in a hinged manner.

According to an embodiment, it is proposed that the upper side of the housing and the lower side of the housing can be positively connected to one another via connecting elements, in particular latching elements or clip elements. This allows the upper side of the housing and the lower side of the housing to be firmly connected to each other. In the connected state, the latching of the upper side of the housing and the lower side of the housing with one another causes the shield contact element to be pressed resiliently against the flat conductor rail, in particular against the shielding conductor of the flat conductor rail, and/or against the connecting conductor, in particular against the shielding conductor of the connecting conductor. This produces a good mechanical contact, which causes an associated good electrical contact between the shield contact element and the shielding conductor.

According to an embodiment, it is proposed that upper housing side and lower housing side are formed for liquid-tight accommodation of the flat conductor rail in the flat conductor receptacle. In particular, the upper housing side and lower housing side form at least one opening for receiving the flat conductor when the housing is closed. This opening can be the flat conductor receptacle. In the area of the opening, the lower side of the housing and the upper side of the housing completely surround the flat conductor. In particular, a seal can be provided, whereby this seal can be arranged on the lower side of the housing as well as the upper side of the housing and in each case seals the opening between the lower side of the housing and the flat conductor rail or the upper side of the housing and the flat conductor rail.

According to an embodiment, it is proposed that the upper housing side and the lower housing side have a substantially circumferential contact edge, wherein a seal is arranged on at least one of the contact edges.

According to an embodiment, it is proposed that upper housing side and lower housing side are formed to receive the flat conductor rail in the flat conductor receptacle in a fluid-tight manner. In particular, the upper housing side and lower housing side form at least one opening for receiving the connecting conductor when the housing is closed. This opening can be the connecting conductor receptacle. The connecting conductor receptacle can be formed in the form of a socket. In the area of the opening, the lower side of the housing and the upper side of the housing completely surround the connecting conductor. In particular, a seal can be provided, whereby this seal can be arranged on the lower side of the housing as well as the upper side of the housing and in each case seals the opening between the lower side of the housing and the connecting conductor or the upper side of the housing and the connecting conductor.

According to one embodiment, it is proposed that the housing top and housing bottom have a substantially circumferential contact edge, wherein a seal is disposed on at least one of the contact edges.

According to one embodiment, the flat conductor receptacle, when installed, may at least partially surround the flat conductor rail from a direction transverse to a longitudinal direction of extension of the flat conductor rail. The flat conductor rail may extend along a first axis. The first axis may be parallel to the longitudinal extension direction of the flat conductor rail. In a second axis, which runs transversely to the first axis and thus transversely to the longitudinal extension direction of the flat conductor rail, the connecting conductor receptacle, which can be formed, for example, as a socket, opening, connection socket or the like, can extend. The connecting conductor can extend in the axis of the connecting conductor receptacle. The connecting conductor receptacle can be formed for plugging on and fastening a connector. The connecting conductor receptacle faces away from the flat conductor receptacle. A connecting conductor receiving space may be provided in the connecting conductor receiving space. The shield contact element can be arranged on the inner wall of the connecting conductor receiving space.

According to an embodiment, the seal can be formed from a different, comparatively softer plastic material than the housing, in particular the upper housing part and/or lower housing part. In the installed state, the seal can be circumferential around the flat conductor receptacle and the through opening in such a way that the contact area is arranged within the seal. A seal can also be arranged in the area of the connecting conductor receptacle. The seal can be a ring seal and, for example, accommodate the connecting conductor circumferentially. The seal can also circumferentially receive a connector contact part. In particular, the seal and the housing are manufactured in a multi-component, preferably two-component injection molding process.

For connecting the upper housing part and the lower housing part, it is proposed that at least one fastening section for clipping the upper housing part and the lower housing part is provided on a side of the flat conductor receptacle facing the connecting conductor receptacle. The flat conductor rail may in particular be a conductor arrangement for a vehicle. The flat conductor rail preferably has a solid core made of an aluminum material or copper material. This makes the flat conductor rail dimensionally stable and can serve as a ground or supply conductor. Surrounding this core (cable core) can be an inner insulation, a shielding element and an outer insulation.

BRIEF DESCRIPTION OF THE DRAWINGS

In the following, the subject matter is explained in more detail with reference to drawings showing embodiments. The drawings show.

DETAILED DESCRIPTION OF SPECIFIC EMBODIMENTS

Figure 1A:
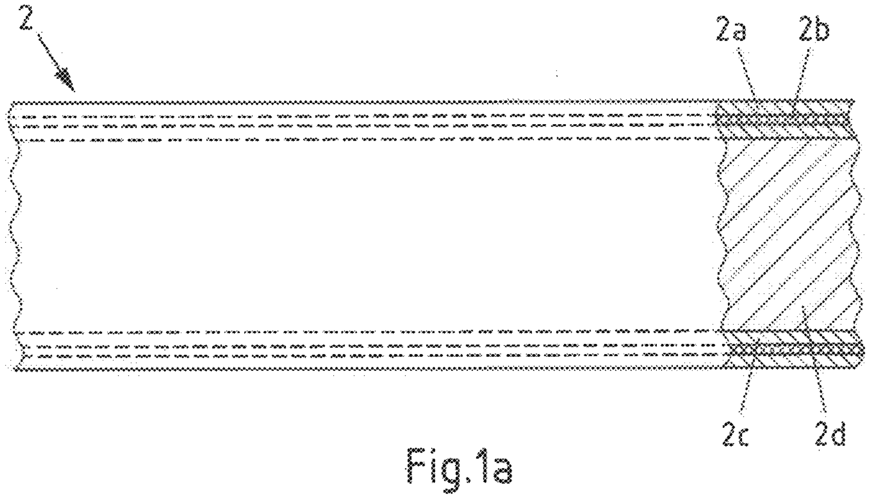
FIG. 1*a-d* flat conductor rails.

FIG. 1*a* shows a flat conductor rail 2 with the outer insulation 2*a* still intact. The flat conductor rail, corresponding to FIG. 1*a*, is first provided and then, as shown in FIG. 1*b*, the outer insulation 2*a* is removed in a center area.

Figure 1B:
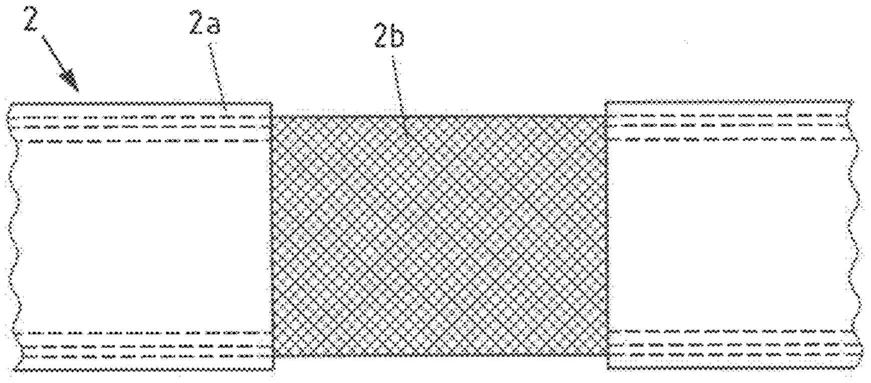

FIG. 1*b* shows the flat conductor rail 2 with the outer insulation 2*a* removed. It can be seen that a shielding conductor 2*b* is arranged under the outer insulation 2*a*. The shielding conductor 2*b* can be formed as a braid, foil or combination thereof.

Figure 1C:
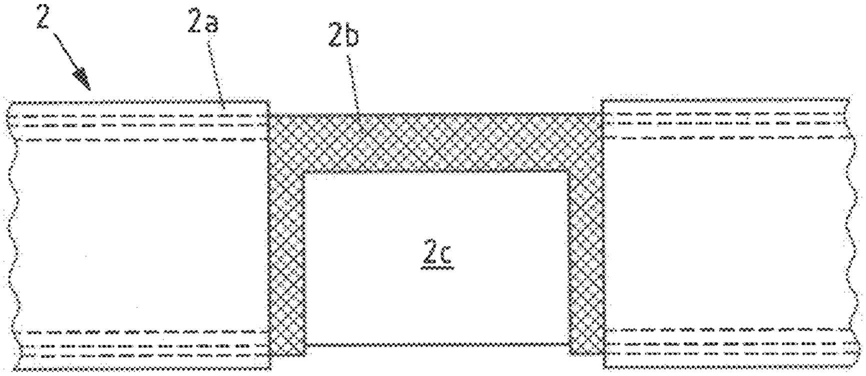

Following the removal of the outer insulation 2*a*, a center area of the shielding conductor 2*b* is removed, as shown in FIG. 1*c*. An inner insulation 2*c* is located below the shielding conductor 2*b*. It can be seen that the shielding conductor 2*b* surrounds the exposed area of the inner insulation 2*c* in a U-shape.

The outer insulation 2*a* as well as the inner insulation 2*c* may be formed of a plastic. The inner insulation 2*c* may be an insulation material (a dielectric or comprising a dielectric) having suitable properties to achieve electromagnetic compatibility of the flat conductor rail 2.

Figure 1D:
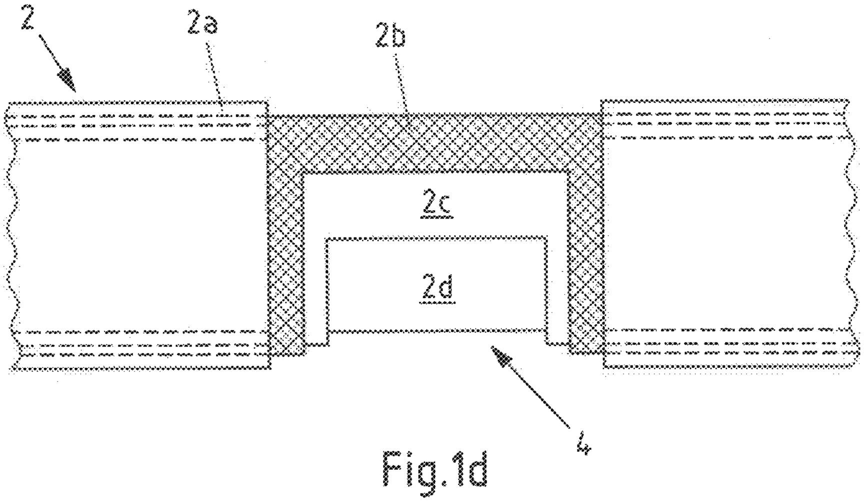

After the shielding conductor 2*b* is cut open, the inner insulation 2*c* is exposed, as shown in FIG. 1*d*, thus exposing a contact area 4 where the core 2*d* of the flat conductor bar 2 is bare. The core 2*d*, also called the cable core, may be formed of a solid material, for example aluminum material or copper material. A connecting conductor can be attached intermetallically to the contact area 4 thus exposed.

The layers 2*a*, 2*b*, 2*c* and 2*d* may be removed on one or both sides. A view of only one broad surface is shown, but it is also disclosed that the layers are correspondingly removed on the other surface not shown.

In the following, it is shown how a lateral outlet is made on the flat conductor rail 2 in an area around the contact area 4 with a present housing with shielding. It is understood, however, that not only a lateral outgoing feeder but also an outgoing feeder at an end area, in particular at the end face of the flat conductor rail 2, is possible. Accordingly, what has been said here can also be applied to housings which are arranged at the end face of the flat conductor rail 2. As in this case, the flat conductor housing, which is shown below as being continuous, can also be formed with only one opening.

Figure 2A:
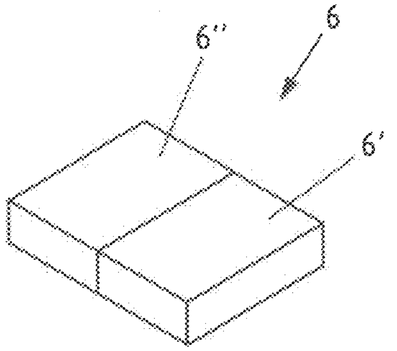
FIG. 2*a-b* connecting conductors.

A connecting conductor 6 is shown in FIG. 2. FIG. 2*a* shows a connecting conductor 6 (here the stranded wire or cable core) formed as a bimetallic component having a first end 6' and a second end 6", which may be formed of different metallic materials, for example aluminum material and copper material. With one of the ends 6', 6", the connecting conductor 6 can be materially connected to the core 2*d* of the flat conductor rail 2 in the contact area 4. In particular, the end 6', 6" is connected to the core 2*d*, which is formed from the same or similar material as the core 2*d*.

Figure 2B:
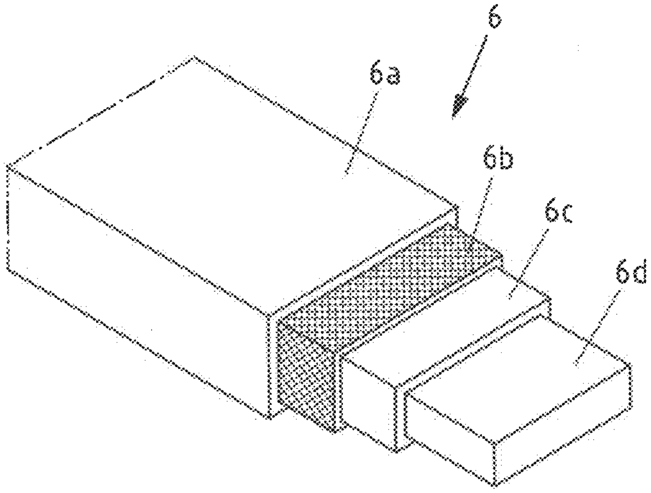

FIG. 2*b* shows a further connecting conductor 6, which has a multi-layer shielded structure, corresponding to the flat conductor rail 2 and can also be bimetallic as shown above. The core 6*d* of the connecting conductor 6 is surrounded by an inner insulation 6*c*, a shielding conductor 6*b* and an outer insulation 6*a*. The connecting conductor 6 may be exposed at one end, for example.

At the exposed end, the core 6*d* can be directly intermetallically connected to the core 2*d* of the flat conductor rail 2 in the contact area 4, in particular by material bonding. The exposed end of the connecting conductor 6 can be exposed in such a way that first the core 6*d* is exposed and lies on the inner insulation 6*c* at a distance from the end face of the shielding conductor 6*b*. Then, an electrical connection can be made between the shielding conductor 2*b* and the shielding conductor 6*b* via a shield contact element as will be shown below.

Figure 3:
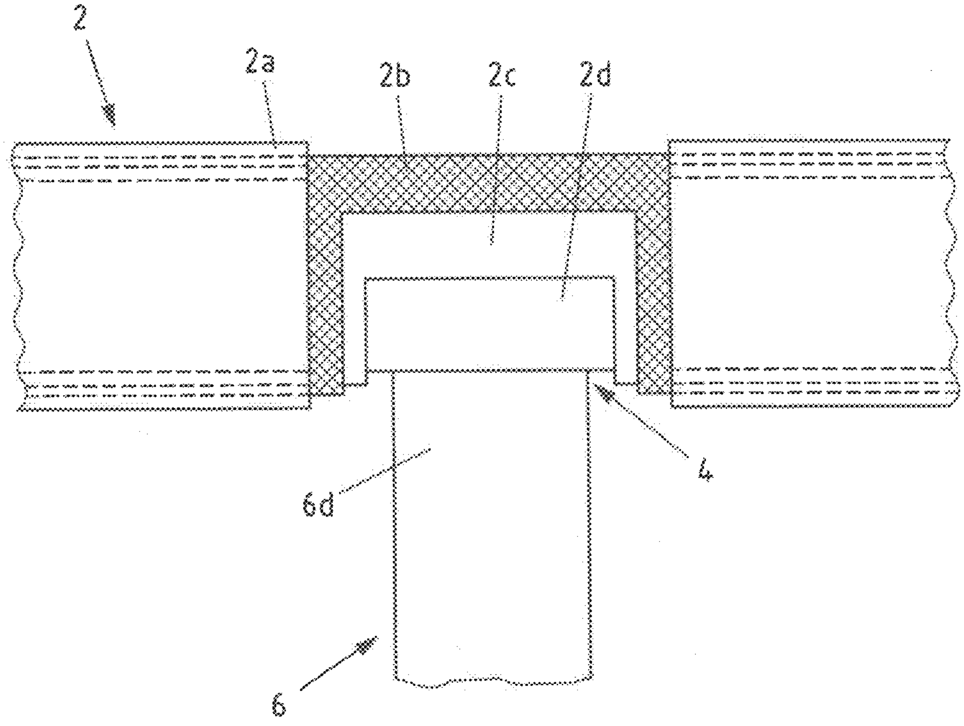
FIG. 3 a connecting conductor connected to a flat conductor rail.

FIG. 3 shows a connection between the flat conductor rail 2 and the connecting conductor 6. In FIG. 3 it can be seen that an exposed end 6', 6" of the core 6*d* of the connecting conductor 6 is intermetallically connected to the core 2$d$ of the flat conductor rail 2. This connection is in the contact area 4. Surrounding the contact area in a U-shape are the inner insulation 2$c$ and the shielding conductor 2$b$. There is no shielding in the area of the connection between the core 6$d$ and the core 2$d$.

Figure 4:
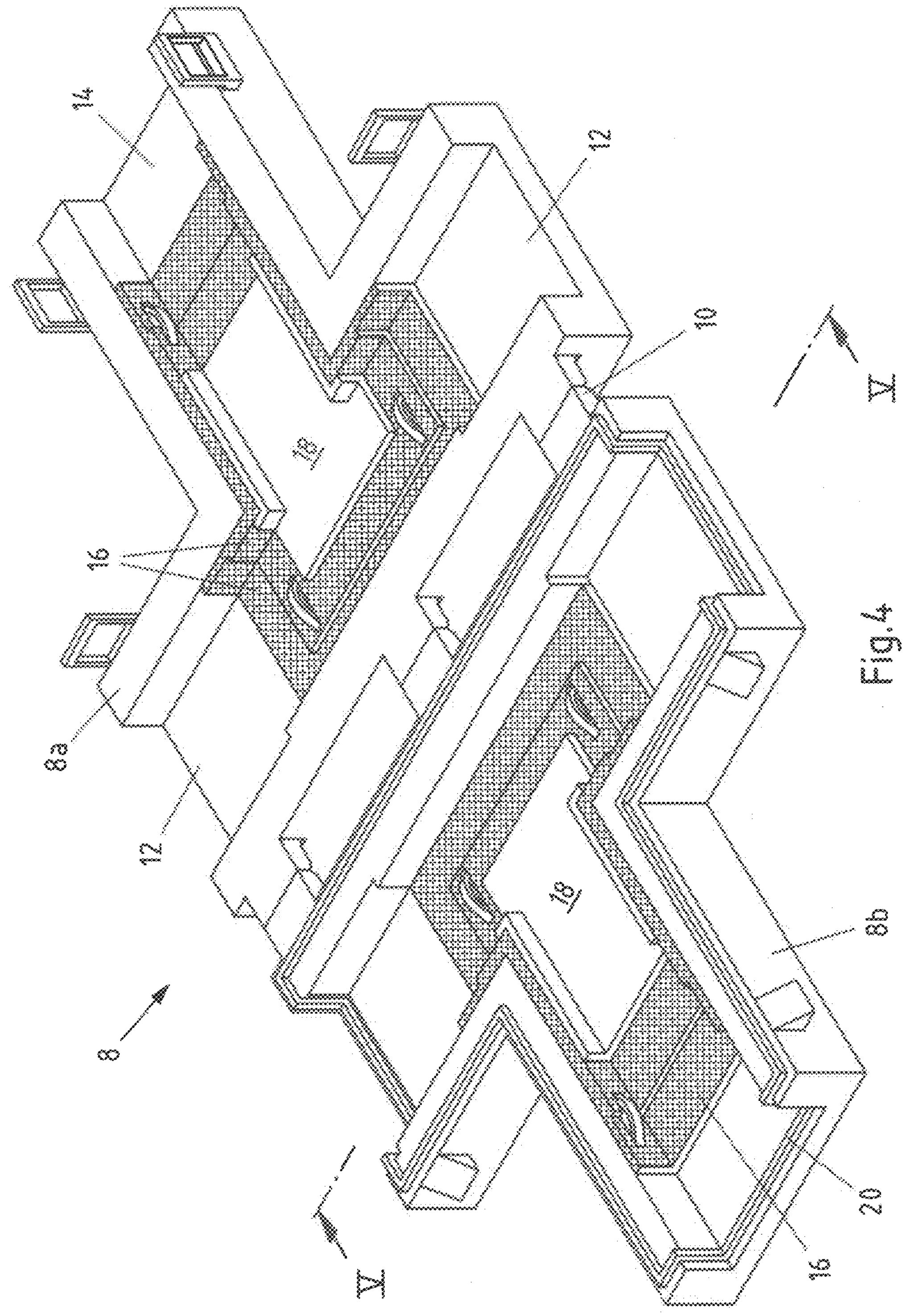
FIG. 4 an opened housing.

To be able to provide such shielding, a housing 8 as shown in FIG. 4 is proposed. The housing 8 may have a upper housing side 8$a$ and a lower housing side 8$b$. Upper housing side 8$a$ and lower housing side 8$b$ may be hinged to each other, for example via a film hinge 10. Other hinge elements are also possible. FIG. 4 shows a view of an unfolded housing 8, in which the inner sides of housing top 8$a$ and housing bottom 8$b$ can be seen.

The structure of the upper housing part 8$a$ is described below. A corresponding structure may alternatively or cumulatively also be provided on the lower housing part 8$b$.

A flat conductor receptacle 12 may be provided along the longitudinal extent of the housing top 8$a$. The flat conductor receptacle 12 may be trough-shaped and embrace a flat conductor rail 2 at least along two, preferably along 3 sides. A connecting conductor receptacle 14 can extend transversely to this longitudinal extension of the flat conductor receptacle 12. The connecting conductor holder 14 can also be trough-shaped and hold a connecting conductor 6 on two, preferably 3 sides.

A shield contact element 16 can be provided in a central area of the housing top side 8$a$, in particular in a area in which the longitudinal axes of the flat conductor receptacle 12 and the connecting conductor receptacle 14 intersect. The shield contact element 16 may extend in a planar manner and abut the inner side of the upper side of the housing 8$a$. The shield contact element 16 may be formed of a metal. The shield contact element 16 may protrude out of the plane of the inner wall in the area of the longitudinal axis of the flat conductor receptacle 12. The shield contact element 16 may thereby be shaped in the manner of a spring out of the plane of the drawing, for example in an arcuate manner.

An insulating element 18 may be provided in a central area of the shield contact element 16, which may be formed as a dielectric or may comprise a dielectric. The insulating element 18 may extend from the central area of the shield contact element 16 toward the flat conductor receptacle 14 into the flat conductor receptacle 14.

The shield contact element 16 may also extend into the connecting conductor receptacle 14, preferably being arranged, for example, on the side walls, in particular on one or both side walls and/or the inner side of the upper side 8$a$ of the housing of the connecting conductor receptacle 14. Also, on one or both side walls of the connecting conductor receptacle 14, the shield contact element 16 may protrude from the surface of the side wall in an arcuate manner as indicated in FIG. 4.

In particular, the insulating element 18 is shaped such that, in the joined state, it rests directly on the contact area 4, in particular on the cores 2$d$, 6$d$. In particular, it is congruent with the contact area 4 or preferably overlaps the contact area 4 on all sides so that a short circuit between the shield contact element 16 and the cores 2$d$, 6$d$ is excluded.

Figure 5:
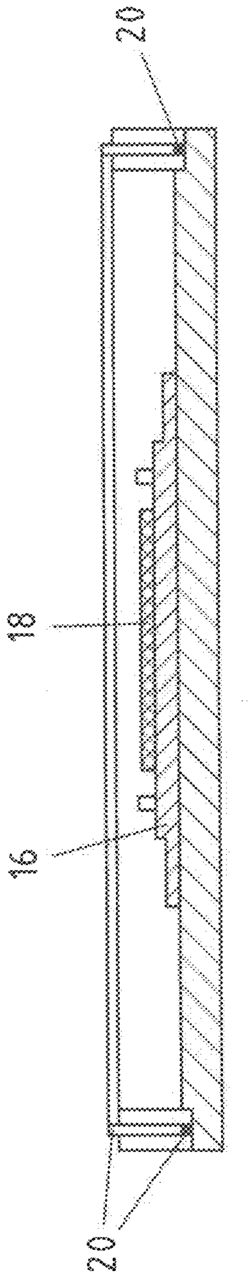
FIG. 5 a section through a housing top.

FIG. 5 shows a section parallel to the flat conductor receptacle 12. Seals 20 can be provided at the side edges in the area of the flat conductor receptacle 12. Centrally, the shield contact element 16 may be arranged, which is covered with the insulation element 18 in the area associated with the contact area. It can also be seen that the shield contact element 16 projects out of the plane in an arcuate manner.

Figure 6A:
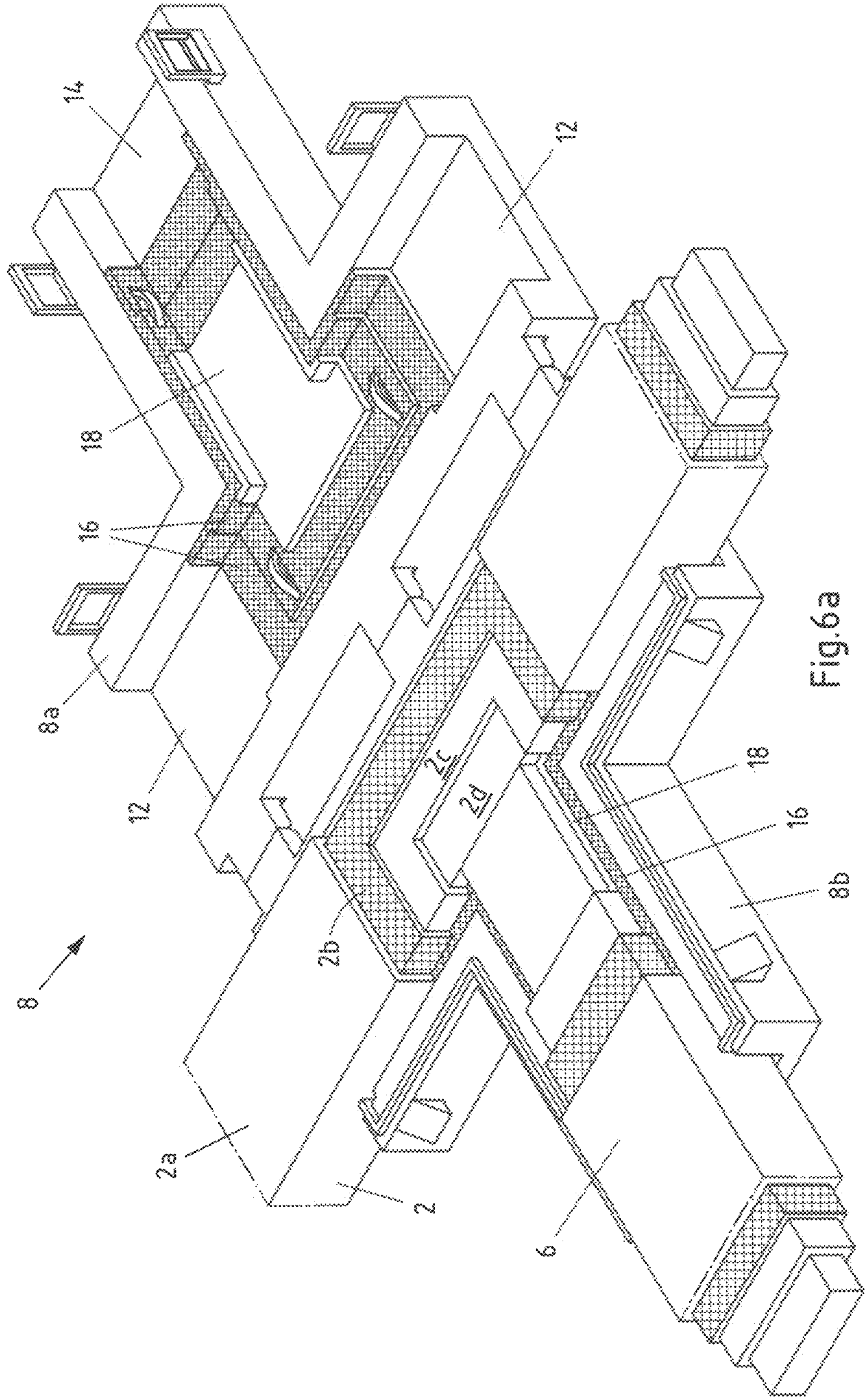
FIG. 6*a-b* a housing with flat conductor rail inserted.
Figure 6B:
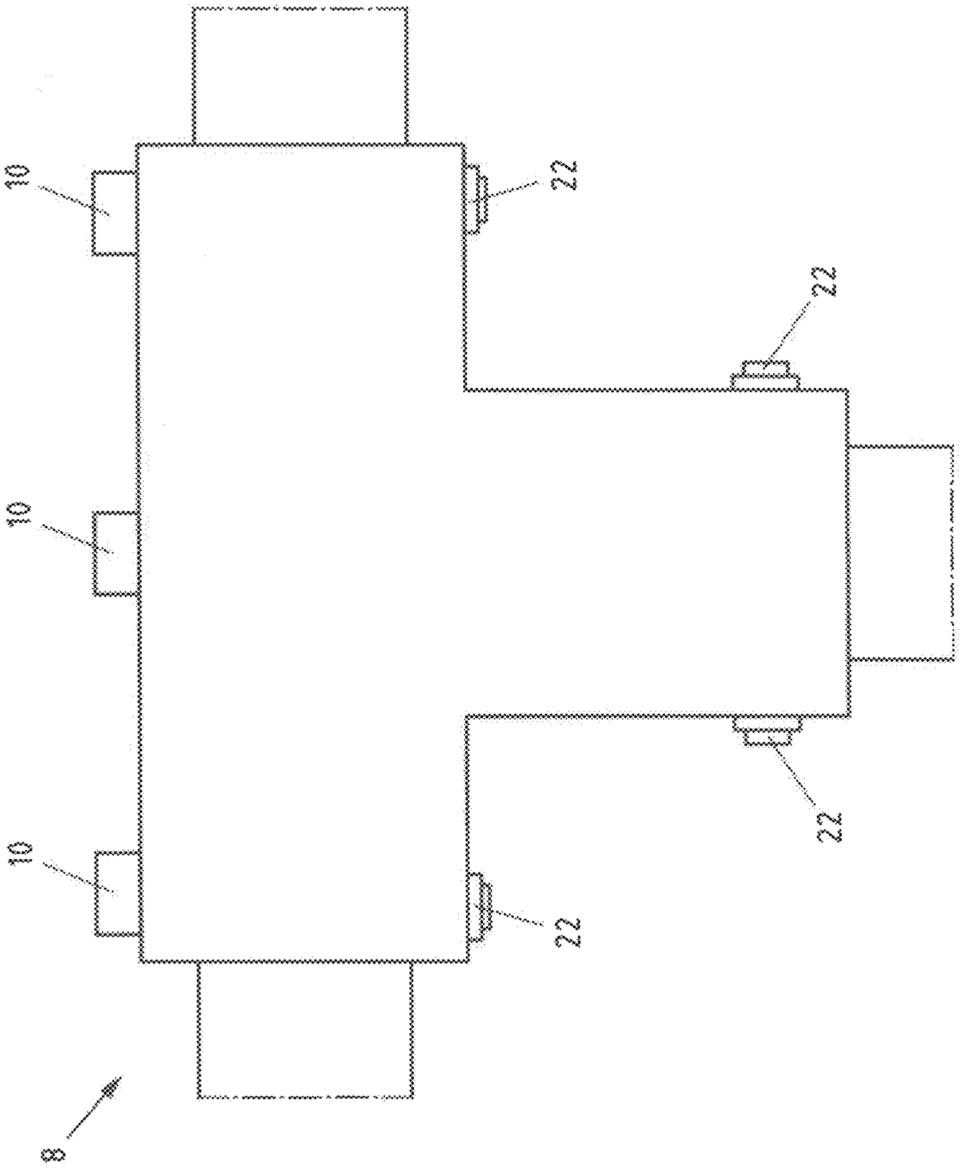

FIG. 6$a$ shows the housing 8 joined with a flat conductor rail 2 and a connecting conductor 6. It can be seen that the flat conductor 2 is inserted into the flat conductor receptacle 12. Inside the housing 8, in particular surrounded by the seals 20, the flat conductor rail 2 is stripped and the shielding conductor 2$b$ is exposed. As described with respect to FIG. 3, the connecting conductor 6 is connected with its core 6$d$ to the flat conductor rail 2, in particular its core 2$d$, by a material bond.

The upper side of the housing 8$a$ is then placed on the lower side of the housing 8$b$. In the process, the insulation element 18 rests on the area in which the flat conductor rail 2 and the connecting conductor 6 are stripped and their cores 2$d$, 6$d$ are exposed. The shield contact element 16 lies in an area in which the shield conductor 2$b$ is exposed and makes mechanical and electrical contact with it. By extending the shield contact conductor 16 into the connecting conductor receptacle 14, the shield contact element 16 can also come into contact with a shield conductor 6$b$ of the connecting conductor 6.

FIG. 6$b$ shows the housing 8 in the joined state. By means of latching elements 22, the upper side of the housing 8$a$ and the lower side of the housing 8$b$ are latched together in a force-locking and form-locking manner, so that a contact pressure can be exerted on the shield contact element 16 and the latter rests against the shielding conductor 2$b$ and/or the shielding conductor 6$b$ with a contact pressure.

Figure 7:
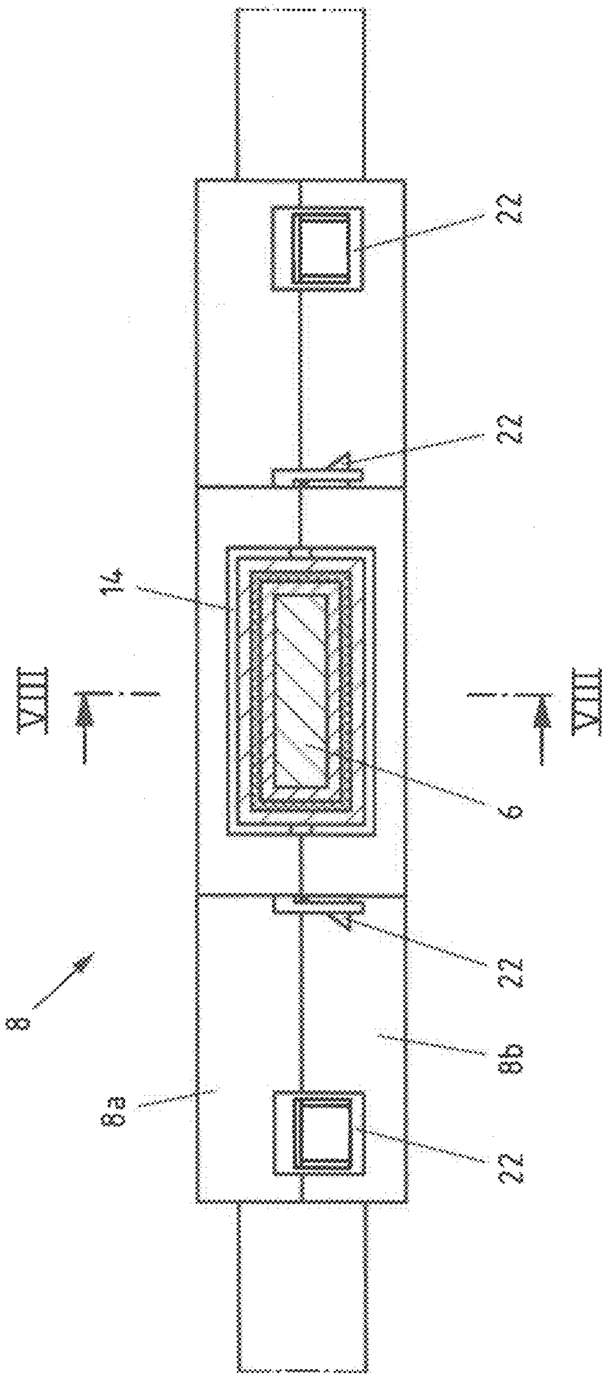
FIG. 7 a side view of a housing with connecting conductor and flat conductor rail.

In a side view into the connecting conductor receptacle 14, the housing 8 is shown in FIG. 7. The latching elements 22, which connect the upper side of the housing 8$a$ and the lower side of the housing 8$b$, can be seen. The connecting conductor 6 protrudes out of the connecting conductor receptacle 14 from the drawing plane.

Figure 8:
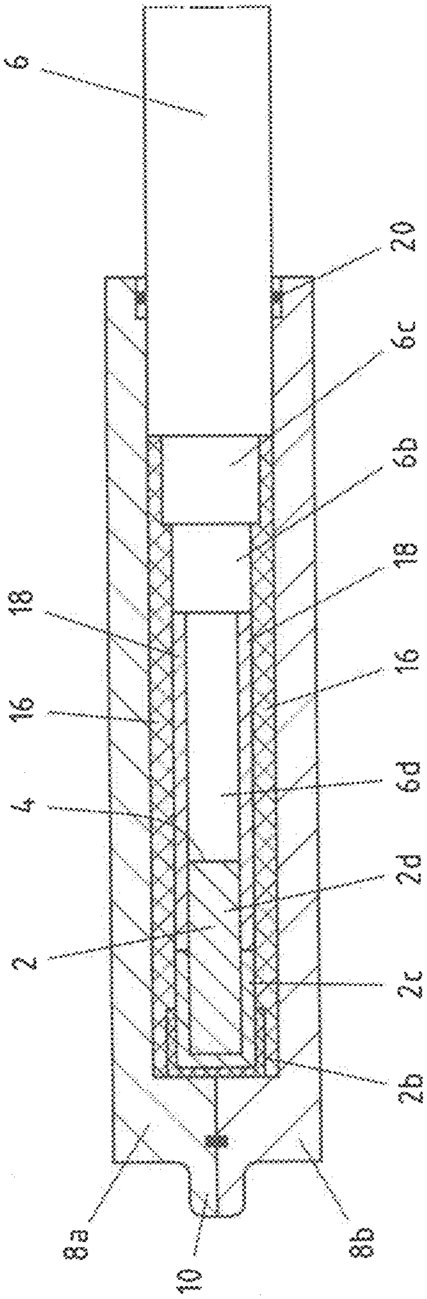
FIG. 8 a sectional view of a housing with a flat conductor rail and a connecting conductor.

FIG. 8 shows the structure of the joined housing 8 in a view parallel to the longitudinal extent of the connecting conductor receptacle 16. It can be seen that the core 2$d$ is directly connected to the core 6$d$. Spaced from the exposed core 2$d$, the insulating element 18 can insulate the shield contact element 16 from the core 2$d$.

LIST OF REFERENCE SIGNS

2 flat conductor rail
2$a$ outer insulation
2$b$ shielding conductor
2$c$ inner insulation
2$d$ core
4 contact area
6 connecting conductor
6$a$ outer insulation
6$b$ shielding conductor
6$c$ inner insulation
6$d$ core
6', 6" end
8 housing
8$a$, b top/bottom
10 film hinge
12 flat conductor receptacle
14 connecting conductor receptacle
16 shield contact element
18 insulation element
20 gasket
22 latching element

What is claimed is:

1. A system with a flat conductor rail having
an inner conductor,
an inner insulation surrounding the inner conductor, a shielding conductor surrounding the inner insulation, an outer insulation surrounding the shielding conductor, wherein in a contact area the inner conductor is exposed, wherein the shielding conductor is exposed surrounding the contact area, and wherein a connecting conductor is materially connected to the flat conductor rail in the contact area, and a housing with a flat conductor receptacle extending along a first axis, a connecting conductor receptacle extending transversely to the first axis along a second axis, wherein the flat conductor receptacle and the connecting conductor receptacle are formed from an upper housing side and a lower housing side each with an inner side and an outer side, which in a closed state of the housing receive the flat conductor rail with their inner sides lying opposite on another, wherein a contact area is formed in the flat conductor receptacle in an area in which the first axis and the second axis intersect each other and a shield contact element arranged two-dimensionally on at least one inner side and extending from the contact area into the flat conductor receptacle and the connecting conductor receptacle and the shield contact element bearing directly against a shielding conductor of the flat conductor rail when the housing is in the closed state, wherein the upper housing side and/or the lower housing side are arranged in the contact area as a multilayer laminate with an outer insulating material, an insulation element and the shield contact element arranged between the outer insulating material and the insulation element and the shield contact element is arranged laterally of the contact area and projects out of the plane of the inner side arch shaped, wherein the flat conductor rail is arranged in the flat conductor receptacle, wherein the connecting conductor is arranged in the connecting conductor receptacle, wherein the housing is closed such that the shield contact element directly abuts the shielding conductor, wherein the shield contact element on the inside of the upper side of the housing or the inside of the lower side of the housing abut the shielding conductor.

2. The system according to claim 1, wherein the insulation element made of a dielectric is arranged between the exposed shield contact element and the connecting conductor in the contact area.

3. The system according to claim 1, wherein the contact area is completely surrounded by the housing.

4. A method of manufacturing a system according to claim 1, comprising the steps of providing the flat conductor rail having the inner conductor, the inner insulation surrounding the inner conductor, the shielding conductor surrounding the inner insulation, and the outer insulation surrounding the shielding conductor;

removing the outer insulation, the shielding conductor and the inner insulation in a contact area;

removing the outer insulation in an area surrounding the contact area;

providing the connecting conductor;

connecting the connecting conductor to the inner conductor of the flat conductor rail in the contact area;

providing the housing;

arranging the flat conductor rail in the flat conductor receptacle;

arranging the connecting conductor in the connecting conductor receptacle;

closing the housing, such that the shield contact element directly abuts the shielding conductor.

* * * * *